US007696427B2

(12) United States Patent
West et al.

(10) Patent No.: US 7,696,427 B2
(45) Date of Patent: Apr. 13, 2010

(54) METHOD AND SYSTEM FOR RECOMMENDING MUSIC

(75) Inventors: Kristopher C. West, Weybridge (GB); Paul B. Lamere, Nashua, NH (US)

(73) Assignee: Oracle America, Inc., Redwood Shores, CA (US)

( * ) Notice: Subject to any disclaimer, the term of this patent is extended or adjusted under 35 U.S.C. 154(b) by 629 days.

(21) Appl. No.: 11/650,289

(22) Filed: Jan. 3, 2007

(65) Prior Publication Data

US 2008/0133441 A1 Jun. 5, 2008

Related U.S. Application Data

(60) Provisional application No. 60/872,391, filed on Dec. 1, 2006.

(51) Int. Cl.
*G10H 1/00* (2006.01)
*G06F 17/00* (2006.01)
*G06F 17/30* (2006.01)
*G06N 5/02* (2006.01)

(52) U.S. Cl. .................... 84/615; 84/477 R; 706/46; 707/3; 707/4; 707/E17.014; 707/E17.101

(58) Field of Classification Search .............. 84/615, 84/477 R; 706/46; 707/3, 4, E17.014, E17.101
See application file for complete search history.

(56) References Cited

U.S. PATENT DOCUMENTS

| 6,993,532 | B1 * | 1/2006 | Platt et al. .................. 707/102 |
| 2002/0002899 | A1 * | 1/2002 | Gjerdingen et al. .......... 84/667 |
| 2002/0147628 | A1 * | 10/2002 | Specter et al. ................ 705/10 |
| 2006/0083119 | A1 * | 4/2006 | Hayes ..................... 369/30.09 |
| 2006/0101060 | A1 * | 5/2006 | Li et al. ..................... 707/102 |
| 2007/0094215 | A1 * | 4/2007 | Toms et al. .................. 706/52 |
| 2007/0124293 | A1 * | 5/2007 | Lakowske et al. ............. 707/3 |
| 2007/0214133 | A1 * | 9/2007 | Liberty et al. ................. 707/5 |
| 2008/0065469 | A1 * | 3/2008 | Specter et al. ................ 705/10 |
| 2008/0133601 | A1 * | 6/2008 | Martin Cervera et al. 707/104.1 |
| 2008/0195970 | A1 * | 8/2008 | Rechsteiner et al. ........ 715/810 |

(Continued)

OTHER PUBLICATIONS

Hu, X. et al.; "Mining Music Reviews: Promising Preliminary Results"; Proceedings of Int. Symposium on Music Info. Retrieval (ISMIR); Jan. 2005, pp. 536-539; 4 pages.

(Continued)

*Primary Examiner*—Jeffrey Donels
*Assistant Examiner*—Christina Russell
(74) *Attorney, Agent, or Firm*—Osha • Liang LLP (57) ABSTRACT

A method for recommending music that includes identifying a granularity of a plurality of genres based on a request for music similarity, wherein the request identifies a user, training a genre classifier based on the granularity to obtain a trained genre classifier, calculating a first profile by the trained genre classifier, wherein the first profile that includes, for each of the plurality of genres, the likelihood that a music selection associated with a user is in the genre, calculating a second profile by the trained genre classifier, wherein the second profile that includes, for each of the plurality of genres, the likelihood that an unknown music selection is in the genre, obtaining a first similarity score between the first profile and a second profile, and recommending the unknown music selection to the user based on the first similarity score.

20 Claims, 5 Drawing Sheets

U.S. PATENT DOCUMENTS

2008/0249982 A1* 10/2008 Lakowske ............... 707/3
2008/0256042 A1* 10/2008 Whitman ............... 707/3

OTHER PUBLICATIONS

Gracenote. Web Page; "Gracenote Playlist"; Jan. 2005; http://www.gracenote.com/gn_products/onesheets/Gracenote_Playlist.pdf; 2 pages.

Gracenote. Web Page; "Gracenote MusicID"; Jan. 2005; http://www.gracenote.com/gn_products/onesheets/Gracenote_MusicID.pdf; 1 page.

Wang, A.; "Shazam Entertainment"; ISMIR Presentation, Oct. 29, 2003; http://ismir2003.ismir.net/presentations/Wang.pdf; 39 pages.

Logan, B. et al.; "A Music Similarity Function Based on Signal Analysis"; Proceedings of IEEE International Conference on Multimedia and Expo (ICME), Aug. 2001; 4 pages.

Pampalk, E. et al.; "Improvements of Audio-Based Music Similarity and Genre Classification"; Proc. Int. Symposium on Music Info. Retrieval (ISMIR), Jan. 2005; 6 pages.

Aucouturier, J. et al.; "Music Similarity Measures: What's the Use?"; Proc. Int. Symposium on Music Info. Retrieval (ISMIR), Jan. 2002; 7 pages.

Ragno, R. et al.; "Inferring Similarity Between Music Objects with Application to Playlist Generation"; Proc. 7th ACM SIGMM International Workshop on Multimedia Information Retrieval, Nov. 2005; pp. 1-8; 8 pages.

Downie, J. S. et al.; "The 2005 Music Information Retrieval Evaluation Exchange (MIREX 2005): Preliminary Overview"; Proc. Int. Symposium on Music Info. Retrieval (ISMIR), Jan. 2005; 4 pages.

West, K. et al.; "Finding an Optimal Segmentation for Audio Genre Classification"; Proc. Int. Symposium on Music Info. Retrieval (ISMIR), Jan. 2005; pp. 680-685; 6 pages.

West, K.; "Mirex Audio Genre Classification"; Jan. 2005; http://www.music-ir.org/evaluation/mirexresults/articles/audio_genre/west.pdf; 3 pages.

Jiang, D. et al.; "Music Type Classification by Spectral Contrast Feature"; Proc. IEEE International Conference on Multimedia and Expo (ICME02), Lausanne, Switzerland, Aug. 2002; 4 pages.

Berenzweig, A. et al.; "Anchor Space for Classification and Similarity Measurement of Music"; Multimedia and Expo, 2003, ICME '03 Proceedings, 2003 International Conference; Jul. 6-9, 2003, vol. 1, pp. 29-32; 4 pages.

Alghoniemy, M., Tewfik, A.H, "A Network Flow Model for Playlist Generation", University of Minnesota, Aug. 22-25, 2001, 4 pages.

Pampalk, E., Pohle, T., Widmer, G., "Dynamic Playlist Generation based on Skipping Behavior", © 2005 Queen Mary, University of London, Sep. 11-15, 2005, 4 pages.

Logan, B., "Content-Based Playlist Generation: Exploratory Experiments", Hewlett-Packard Labs, © 2002 IRCAM- Centre Pompidou, Oct. 13-17, 2002, 2 pages.

Logan, B., Salomon, A., "A Content-Based Music Similarity Function", Cambridge Research Laboratory, Technical Report Series, Jun. 2001, 15 pages.

Pauws, S., Verhaegh, W., Vossen, M., "Fast Generation of Optimal Music Playlists using Local Search", © 2006 University of Victoria, Oct. 8-12, 2006, 6 pages.

Aucouturier, J., Pachet, F., "Scaling up Music Playlist Generation", SONY Computer Science Laboratory, 2002 IEEE vol. 1, Aug. 26-29, 2002, 4 pages.

* cited by examiner

METHOD AND SYSTEM FOR RECOMMENDING MUSIC

CROSS-REFERENCE TO RELATED APPLICATIONS

This application claims benefit of U.S. Provisional Application Ser. No. 60/872,391 entitled "METHOD AND SYSTEM FOR RECOMMENDING MUSIC," filed on Dec. 1, 2006 in the names of Paul B. Lamere and Kristopher C. West.

BACKGROUND

One of the beneficiaries of technology is the arts. Specifically, the advancement of technology with respect to the Internet and portable digital players has allowed a virtually endless supply of music to be readily available. Virtually instantaneously, a person has access to selections of music from across the world. Moreover, using a computer, a user may purchase music, listen via the Internet to music, download music, store music on a portable device, and generate a playlist.

While performing any of the above actions to acquire and listen to music, a user may want to expand their music collection. Specifically, the user may want to listen to different selections of music that the user has not previously heard. However, with the vast expanse of available music, identifying the new music may be challenging.

When a user wants to listen to new music, the user may rely on recommendations. For example, the user may consult a friend who has similar taste in music to the user. The friend may recommend an artist or a specific music selection. Alternatively, a distributor who maintains statistical data on music purchased or played may make a recommendation to the user based on previous purchasers of the music selection of a user. The recommendation from the distributor is typically achieved in accordance with a voting system.

SUMMARY

In general, in one aspect, the invention relates to a method for recommending music that includes identifying a granularity of a plurality of genres based on a request for music similarity, wherein the request identifies a user, training a genre classifier based on the granularity to obtain a trained genre classifier, calculating a first profile by the trained genre classifier, wherein the first profile that includes, for each of the plurality of genres, the likelihood that a music selection associated with a user is in the genre, calculating a second profile by the trained genre classifier, wherein the second profile that includes, for each of the plurality of genres, the likelihood that an unknown music selection is in the genre, obtaining a first similarity score between the first profile and a second profile, and recommending the unknown music selection to the user based on the first similarity score.

In general, in one aspect, the invention relates to a system for recommending music that includes a genre classifier configured to identify a granularity of a plurality of genres based on a request for music similarity, learn to differentiate between the plurality of genres based on the granularity, calculate a first profile according to the granularity, wherein the first profile that includes, for each of a plurality of genres, the likelihood that a music selection of a user is in the genre, and calculate a second profile according to the granularity, wherein the second profile that includes, for each of the plurality of genres, the likelihood that an unknown music selection is in the genre, and a similarity analyzer connected to the genre classifier configured to obtain a first similarity score between the first profile and a second profile, and recommend the unknown music selection to the user based on the first similarity score.

In general, in one aspect, the invention relates to a computer usable medium that includes computer readable program code embodied therein for causing a computer system to identify a granularity of a plurality of genres based on a request for music similarity, wherein the request identifies a user, train a genre classifier based on the granularity to obtain a trained genre classifier, calculate a first profile by the trained genre classifier, wherein the first profile that includes, for each of the plurality of genres, the likelihood that a music selection associated with a user is in the genre, calculate a second profile by the trained genre classifier, wherein the second profile that includes, for each of the plurality of genres, the likelihood that an unknown music selection is in the genre, obtain a first similarity score between the first profile and a second profile, and recommend the unknown music selection to the user based on the first similarity score.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for computing music similarity between music. Specifically, embodiments of the invention compute music similarity based on the genres (i.e., classical music, jazz music, etc.) of the music. Moreover, embodiments of the invention train a genre classifier to classify music into genres based on the request for the music similarity. Thus, a request from a user interested purely in jazz music would result in a genre classifier trained to recognize the different genres within jazz music (i.e., west coast jazz music, New Orleans jazz music, classical music jazz music, etc.). A user as used herein corresponds to an individual, a computer, or a group thereof that purchases, listens to, creates a playlist of, or performs any other relevant action on music.

Further, one or more embodiments of the invention are able to classify the music into multiple genres simultaneously. In the jazz music example, a selection of music may be classified as being ten percent west coast jazz music and ninety percent New York jazz music. Embodiments of the invention further use the classification to identify the similarity between the music known by the user and an unknown music to determine whether the user might appreciate the unknown music selection. Thus, embodiments of the invention may provide a recommendation to the user for the unknown music.

Figure 1:
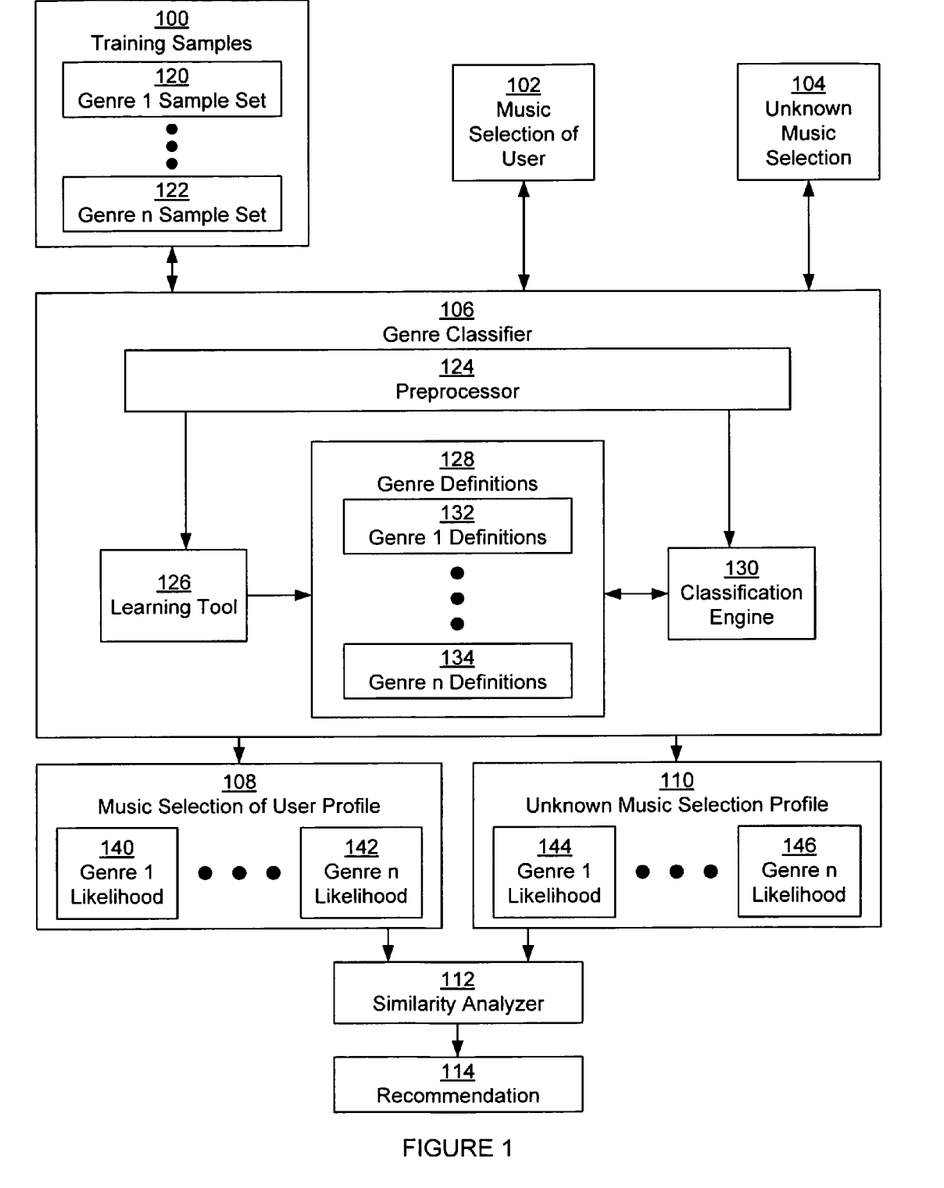
FIG. 1 shows a schematic diagram of a system for computing music similarity in accordance with one or more embodiments of the invention.

FIG. 1 shows a schematic diagram of a system for computing music similarity in accordance with one or more embodiments of the invention. As shown in Figure 1, the system includes training samples (100), music selection of a user (102), unknown music selection (104), genre classifier (106), a music selection of the user profile (108), an unknown music selection profile (110), a similarity analyzer (112), and a recommendation (114). Each of these components is described below.

In one or more embodiments of the invention, training samples (100) correspond to selections of music that are pre-classified into genres (not shown). A genre corresponds to a classification of music. The training samples (100) are pre-divided into genre sample sets (e.g., genre 1 sample set (120), genre n sample set (122)). Each genre sample set (e.g., genre 1 sample set (120), genre n sample set (122)) includes one or more music selections (e.g., songs, symphonies, etc., or portion thereof) that are samples of the genre. In one or more embodiments of the invention, the genre sample sets (e.g., genre 1 sample set (120), genre n sample set (122)) are classified according to a specified granularity.

The granularity of the genres corresponds to the largest variation between music selections in each genre. For example, one set of genres correspond to rock music, country music, etc., while another set of genres may correspond to heavy metal music, hard rock music, etc. In the example, the granularity of the genres in the former classification system is coarser than the granularity of the genres in the latter classification system.

Furthermore, the granularity may vary within a classification system. Thus, in one or more embodiments of the invention, the genres in the classification system span the range of available music. For example, a classification system may have genres corresponding to rock music, country music, new age music, west coast jazz music, east coast jazz music, classical jazz music, classical music, etc. In the aforementioned example classification system, a user interested primarily in jazz music may have a classification system that, while focused on the different genres within jazz music, is able to classify other types of music besides jazz music.

Continuing with FIG. 1, a music selection of a user (102) corresponds to music known by the user. Specifically, the music selection of the user (102) may correspond to music the user has or is in the process of listening to, purchasing, downloading, storing (e.g., on the computer, a portable digital player, or other playing device), playing, etc. Further, the music selection of the user (102) may correspond to one or more songs, compact disks, musical compositions, etc.

In addition to music selection of a user (102), the system also includes an unknown music selection in accordance with one or more embodiments of the invention (104). The unknown music selection (104) corresponds to a music that is not known by the genre classifier or the user. Specifically, the unknown music selection (104) corresponds to a selection of music which has not been classified for the user and which may be recommended to the user. For example, the unknown music selection (104) may correspond to music that the user has stored but is not in a playlist, music available via the Internet or any other medium, or any other type of music that is not used by the user.

The unknown music selection (104), the music selection of the user (102), and the training samples (100) are inputs into a genre classifier (106) in accordance with one or more embodiments of the invention. A genre classifier (106) includes functionality to learn to differentiate between genres and classify selections of music based on the learn differences. As shown in FIG. 1, the genre classifier (106) includes a preprocessor (124), a learning tool (126), genre definitions (128), and a classification engine (130). Each of these components is described below.

A preprocessor (124) includes functionality to preprocess music and thereby prepare the music for classification. Specifically, a preprocessor (124) includes functionality to extract spectral features from the music. The spectral features represent the harmonic content of a piece of audio. For example, rock music may have more drums and subsequently more noise in the spectrum. In contrast, classical music may have a string dominated spectrum and therefore have less variation in amplitude in the spectrum.

In one or more embodiments of the invention, the spectral features correspond to Mel-frequency Cepstral Coefficients. Mel-frequency Cepstral Coefficients describe the timbre of a frame of music. A frame of music corresponds to a short duration of the auditory output from the music.

A learning tool (126) is connected to the preprocessor (124) in accordance with one or more embodiments of the invention. The learning tool (126) includes functionality to differentiate between different genres of music. In one or more embodiments of the invention, the learning tool (126) is configured to use linear discriminant analysis on the extracted spectral features of the training samples to identify differences between the genres.

In one or more embodiments of the invention, the differences between the genres are captured by genre definitions (128) for each genre. A genre definition (e.g., genre 1 definitions (132), genre n definition (134)) corresponds to the set of definitions which distinguish one genre from another genre.

In one or more embodiments of the invention, the genre definitions (128) are stored by the genre classifier (106) on a per user basis. Specifically, each user may have a set of genre definitions (128) that corresponds to the classification system tailored for the user. For example, the genre definitions (128) for one user may define genres with a finer granularity in rock music and a coarser granularity in classical music while the genre definitions for another user may have coarser granularity in rock music and finer granularity in jazz music. Further, in one or more embodiments of the invention, the genre definitions (128) may expire. Specifically, after a certain number of requests, after a certain time, etc., the genre definitions (128) may be considered obsolete. When the genre definitions are considered obsolete, new genre definitions may be created for the user.

The genre definitions (128) are connected to a classification engine (130) in accordance with one or more embodiments of the invention. A classification engine (130) includes functionality to classify the music selection of the user (102) and the unknown music selection (104) using the genre definitions (128). Specifically, the classification engine (130) includes functionality to create profiles of a selection of music (e.g., music selection of the user profile (108), unknown music selection profile (110)).

A profile (e.g., music selection of a user profile (108), unknown music selection profile (110)) corresponds to a description of a selection of music in terms of the genres specified by the request. Specifically, a profile (e.g., music selection of a user profile (108), unknown music selection profile (110)) includes the likelihood that the music is in each genre (e.g., genre 1 likelihood (140, 144), genre n likelihood (142, 146)). Using the profile (e.g., music selection of a user profile (108), unknown music selection profile (110)), a single music may be simultaneously classified under multiple genres. Thus, a selection of music that is part rap music and part country music may be classified as such using the profile (e.g., a rap music likelihood of 0.3 and a country music likelihood of 0.7). In one or more embodiments of the invention, the likelihood is maintained as a number (e.g., percentage, scaled number, etc.).

A similarity analyzer (112) is configured to use the music selection of the user profile (108) and the unknown music selection profile (110) to identify the similarity between the music selection of the user (102) and the unknown music selection (104) in accordance with one or more embodiments of the invention. Specifically, the similarity analyzer (112) is configured to determine whether the music selection of the user (102) and the unknown music selection (104) are similar. Moreover, in one or more embodiments of the invention, the similarity analyzer (112) is configured to generate a similarity score (not shown). In one or more embodiments of the invention, the similarity score may not only rely on the profiles generated by the genre classifier (106), but also profiles generated by other classifiers, such as classifiers that accounts for artists, lyrics, collaborative filtering, etc.

In one or more embodiments of the invention, the similarity analyzer (112) includes functionality to produce a recommendation (114). The recommendation (114) corresponds to a suggestion as to whether the user might enjoy the unknown music selection. For example, the recommendation (114) may correspond to suggesting the unknown music selection to the user, adding the unknown music selection to a playlist, creating an ordering on a playlist, playing the music for the user, or performing any other such technique.

Figure 2:
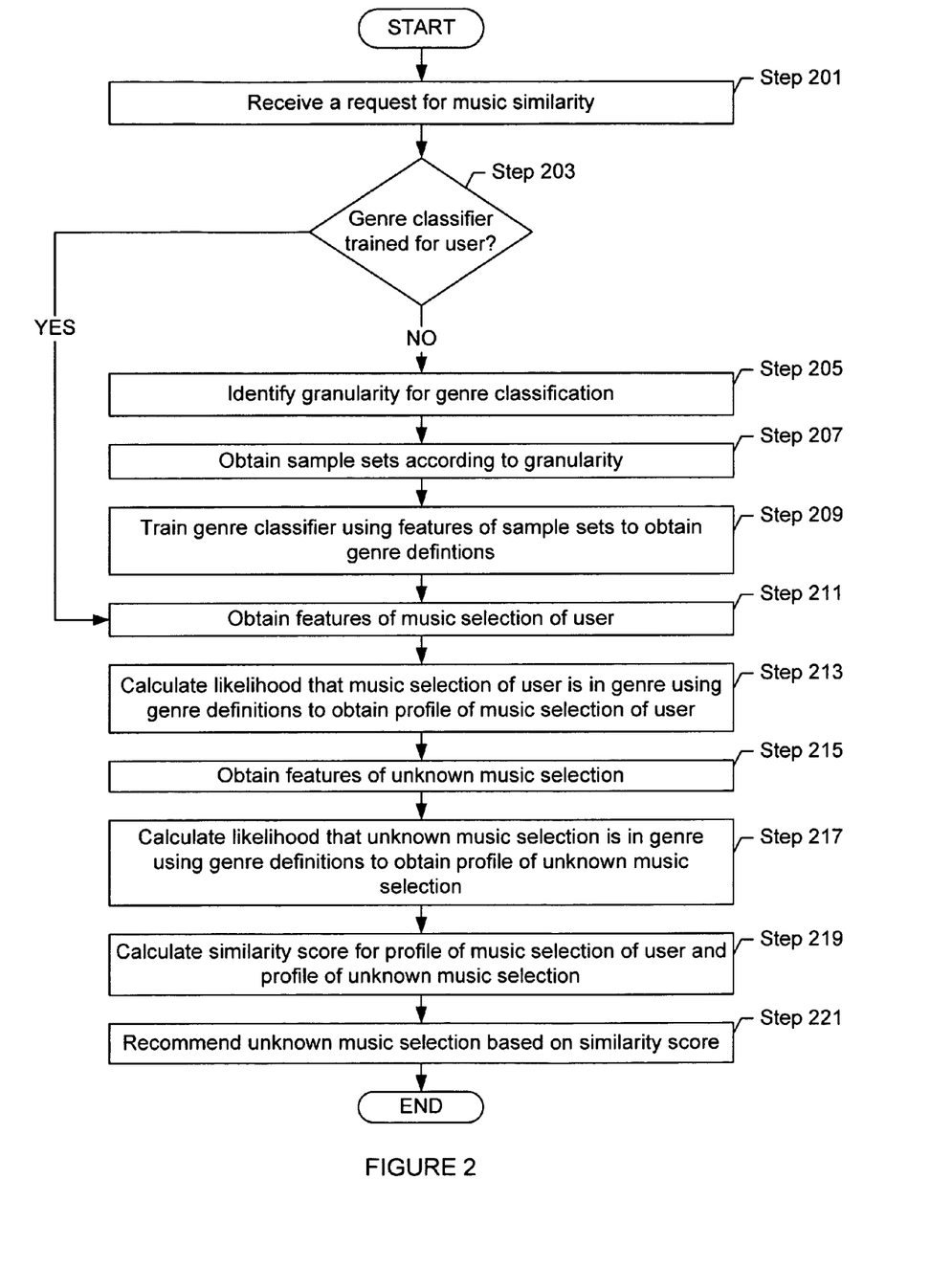
FIG. 2-4 show a flowchart of a method for computing music similarity in accordance with one or more embodiments of the invention.
Figure 3:
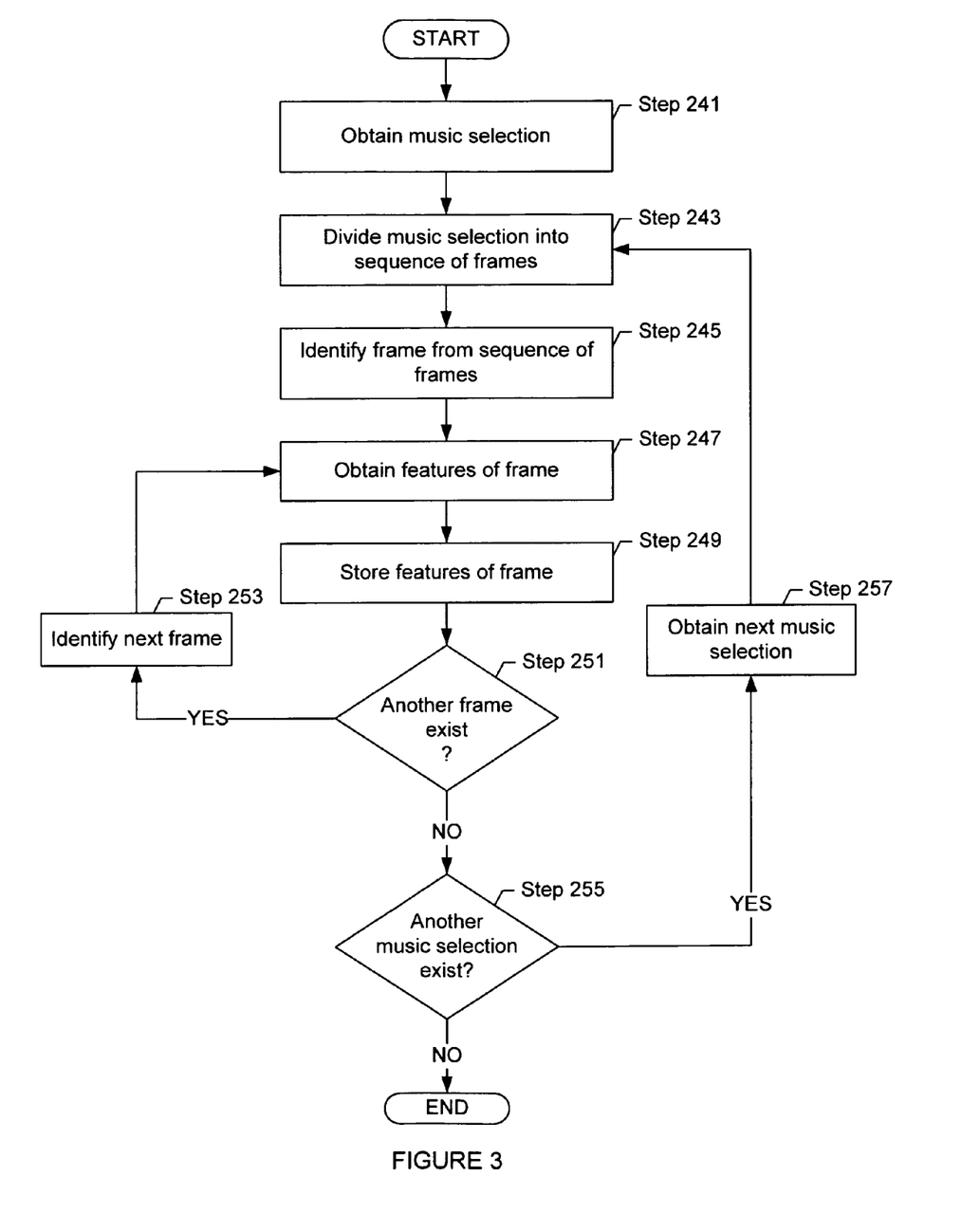
Figure 4:
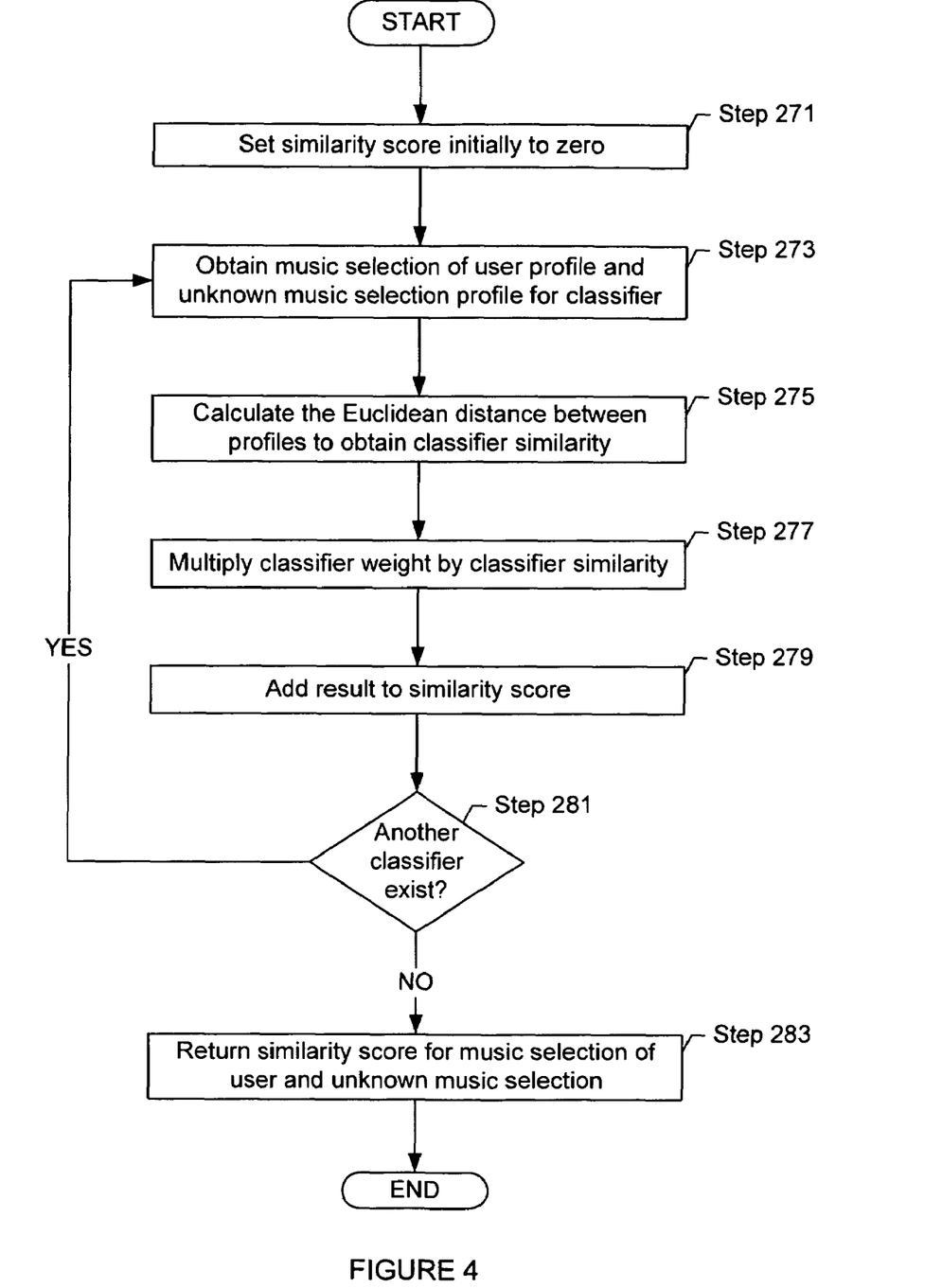

FIGS. 2-4 show a flowchart of a method for computing music similarity in accordance with one or more embodiments of the invention. FIG. 2 shows a flowchart of a method for recommending music to a user. Initially, a request for music similarity is received (Step 201). Often the request is received from a user. In one or more embodiments of the invention, several mechanisms exist for a user to instantiate a request for music similarity. The following are a few examples.

In a first example, a user of an application that provides on demand leasing or purchasing of music may request music similarity. For example, when purchasing a music selection, such as a song, or purchasing a CD, the user may transmit an implicit or explicit request for the application to list similar music selections. Alternatively, a user of an internet radio station that tailors music to user preferences may transmit an implicit or explicit request when the user selects a set of artists, genres, and/or music selections that the user enjoys.

In another example, the request for music similarity may be generated when a user is designing a playlist. Specifically, a user of music playing device, such as a computer, portable digital player, cell phone, etc., may have a collection of music selections available to which the user may listen. However, the user may desire to generate one or more playlists that accounts for similarity. Further, the playlist may need to be ordered based on similarity. For example, a user may desire one playlist for work music and another playlist for workout music. In such example, the user may generate a request by adding a single music selection in each playlist. The request may correspond to a request for building the playlist by adding other music selections similar to the single music selection. The other music selections may or may not be stored by the user.

In another example, the request may be derived from preferences of the user and generated by the introduction of new music. Specifically, in one or more embodiments of the invention, a user may request that as new music is available, the user should receive notification of the new music if the new music is of interest to the user. Thus, when a new music selection is introduced, a similarity analysis may be performed between the new music selection and each music selection of the user.

Regardless of how the request is received, a determination is made whether the genre classifier is trained for the user (Step 203) in accordance with one or more embodiments of the invention. The genre classifier is trained for the user when unexpired genre definitions are stored for the user. The user may also request a retraining of the genre classifier. For example, if the user has changed preferences, then the user may request that the genre definitions be considered expired.

If the genre classifier is not trained for the user, than the granularity for the genre classification is identified (Step 205). Identifying the granularity for the genre classification may be performed by receiving information identifying the granularity from the user, performing data mining on the music in the user's collection, etc.

For example, through a series of data fields, a user may indicate the type of music in which the user is interested. Specifically, a user may type a number representing how much the user is interested in the music. For example, the user may rate the genre using a rating system, such as a one for genres with the greatest interest and five for genres with the lowest interest. The granularity may be adjusted so as to have a finer granularity which the user has greater interest and a coarser granularity in the genres in which the user has less interest.

Another method to identify the granularity may be performed by a data mining on the music known by the user. Specifically, a determination may be made as to the number of music selections that the user has in each genre. At this stage, the genres may be classified into the genres of the artists or the known genres of the music. Specifically, an initial set of genres may be used that have a coarse granularity. For example, the initial set of genres may correspond to country music, rap music, international music, bluegrass music, popular music, etc. The number of music selections in each initial set of genres may be used as an indication on the granularity for each of the genres. For example, the granularity for a user having twenty five music selections divided as follows: twelve music selections in bluegrass music, ten music selections in rap music, and three music selections in country music, may reflect finer granularity in the genres of bluegrass music and the genres of rap music and coarser granularity in the genres of country music.

In another example, the data mining of the music of the user may also account for the number of times that the user plays each selection of music. Thus, for example, if a user has a large number of selections in rock music, classical music, jazz music, and country music, but plays ninety percent country music, then the granularity of the country music is greater than the granularity of the other genres. Thus, the focus of the genre classifier remains updated with the music to which the user listens.

Once the granularity is determined, the sample sets are obtained according to the granularity (Step 207). Specifically, sample selections from each genre are obtained so as to span the genre. For example, if one of the genres corresponds to country music, than sample selections for country music are obtained that span different types of country music. Specifically, the sample selection may span classical country music artists and modern country music artists. If another genre corresponds to New Orleans jazz, then the sample set for New Orleans jazz music may span artists representing aspects of New Orleans jazz.

When the sample sets are obtained, features are extracted from the sample sets. FIG. 3 shows a flowchart of a method for extracting features from the sample sets. Specifically, FIG. 3 shows a flowchart of a method for extracting features for each genre. As shown in FIG. 3, initially, a music selection is obtained (Step 241). Specifically, the audio output of the music selection is obtained. Next, the music selection is divided into a sequence of frames (Step 243). In one or more embodiments of the invention, the music selection is divided a sequence of twenty three millisecond frames that overlap by fifty percent.

Once the music selection is divided into frames, a frame in the sequence of frames is identified (Step 245). The identified frame may correspond to any frame in the sequence of frames. Next, the features of the frame are obtained (Step 247). Multiple methods for obtaining the features of the frame exist. Below is an example of one method to obtain the features of the frame.

First, a fast Fourier transformation may be performed on the frame to identify a set of coefficients. A fast Fourier transformation provides a mechanism to transform function in terms of time to a function in terms of frequencies. The frequencies correspond to the coefficients. After performing the Fast Fourier transformation, Mel-frequency filter weights may be applied to the coefficients to obtain Mel-frequency cepstral coefficients in accordance with one or more embodiments of the invention. The Mel-frequency filter weights weight the coefficients according to human perception. Specifically, because humans perceive larger and larger intervals of frequency to have the same pitch increments, coefficients may be adjusted such that larger and larger intervals are treated as the same within each interval to reflect human perception. In one or more embodiments of the invention, sixteen filters are used to reduce the number of coefficients. Alternatively, the coefficients without the Mel-frequency filter weights may be used. Further, in one or more embodiments of the invention, Mel-frequency cepstral coefficients may be further processed by removing the noise to extract Mel-frequency spectral irregularity coefficients. Thus, the coefficients may correspond to Mel-Frequency Spectral Irregularities.

Regardless of whether Mel-frequency spectral irregularity coefficients, Mel-frequency cepstral coefficients, or the coefficients without the Mel-frequency filter weights are used, the coefficients are stored as features of the frame (Step 249). Specifically, the coefficients are stored as features of the frame. When processing the training samples, the features of the frame are identified by the genre of the music selection.

Once the features of the frame are obtained, a determination is made whether another frame exists in the music selection (Step 251). If another frame exists in the music selection, then the next frame is identified (Step 253). After identifying the next frame, the next frame is preprocessed (Step 247).

Once the frames of a music selection are preprocessed, then an onset detection function may be applied to the frames to segment the frames into units corresponding to a single audio event. For example, a collection of frames corresponding to the first seven seconds of Gershwin's "Rhapsody in Blue" may be combined into a single unit using an onset detection function. Rather than using an onset detection function, the frames may be treated individually in further processing.

Continuing with FIG. 3, if another frame does not exist that is not already preprocessed, then a determination is made whether another music selection exists (Step 255). If another music selection exists, then the next music selection is obtained (Step 257) in accordance with one or more embodiments of the invention. The next music selection is then preprocessed starting with Step 243.

Returning to FIG. 2, when the features for all of the sample sets are obtained, the genre classifier is trained using features of the sample sets to obtain genre definitions (Step 209). Training the genre classifier may be performed using virtually any machine learning algorithm. For example, in one or more embodiments of the invention, linear discriminant analysis is used. In linear discriminant analysis the features of a frame may be represented by a point in a hyperspace. Thus, a sample set corresponding to a genre may be represented as a collection of points in the hyperspace. A hyperplane is calculated that provides the greatest separation between the sample sets belonging to different genres. The hyperplanes may then be used to create the genre definitions. Specifically, a frame represented by a point on one side of the hyperplane is classified as in a different genre than a frame represented by a point on another side of the hyperplane.

Continuing with FIG. 2, once the genre classifier is trained for the user, the features of the music selection of the user are obtained (Step 211). Obtaining the features of the music selection of the user may be performed as described above and in FIG. 3. Furthermore if the genre classifier is trained with features corresponding to Mel-frequency cepstral coefficients, then the features of the music selection of the user that are obtained correspond to Mel-frequency cepstral coefficients.

Next, the likelihood that the music selection of the user is in each genre is calculated using the genre definitions to obtain the profile of the music selection of the user (Step 213). In one or more embodiments of the invention, the profile identifies the amount of frames that are classified in each genre. For example, if thirty percent of the frames of audio may be classified as rap music using the genre definitions, then the profile reflects that a music selection is thirty percent rap music.

Similar to the music selection of the user, the unknown music selection is also classified. Specifically, the features of the unknown music selection are obtained (Step 215). Obtaining the features of the unknown music selection may be performed as described above and in FIG. 3. Next, the likelihood that the unknown music selection is in the genre is calculated using the genre definitions to obtain the profile of the unknown music selection (Step 217). Calculating the likelihood that the unknown music selection is in each genre may be performed in a manner similar to calculating the likelihood that the music selection of the user is in each genre.

Once the profile of the music selection of the user and the profile of the unknown music selection are obtained, a similarity score is calculated for the profile of the music selection of the user and the profile of the unknown music selection (Step 219). The similarity score may be calculated by using the Euclidean distance between the profiles of the music selection of the user and the profile of the unknown music selection. In one or more embodiments of the invention, the similarity score may be calculated when multiple different classifiers are used.

FIG. 4 shows a method for calculating a similarity score when more than one classifier is used. As shown in FIG. 4, initially, the similarity score is initialized at zero (Step 271). Next, the profile of the music selection of the user and the profile of the unknown music selection are obtained for a classifier (Step 273). The classifier may correspond to the audio based classifier described above, a classifier based on the artists (e.g., music from Kid Rock is seventy percent rap music, twenty percent rock music, and ten percent country music), or a classifier based on the lyrics (e.g., lyrics having obscene words or profane words may have a likelihood of rock music, whereas lyrics that include words related to ranches have a likelihood of country music).

Once the profiles are obtained, the Euclidean distance between the profiles is calculated to obtain classifier similarity (Step 275). In one or more embodiments of the invention, rather than using a direct Euclidean distance, the distance may be weighted to give more preferences to genres having finer granularity and less preference to genres having coarser granularity.

After obtaining the classifier similarity, a classifier weight is multiplied by the classifier similarity (Step 277). The classifier weight is the amount of weight given to the results of the classifier. For example, if a classifier based on lyrics is more accurate than a classifier based on artist, then the classifier weight for the classifier based on lyrics may be greater than the classifier weight for the classifier based on artist.

Next, the result of the multiplication of the classifier weight and the classifier similarity is added to the similarity score (Step 279). Once the result is added to the similarity score, a determination is made whether another classifier exists (Step 281). If another classifier exists, then the process repeats for the next classifier starting with Step 273.

Alternatively, when another classifier does not exist that has not been considered, then the similarity score for the music selection of the user and the unknown music selection is returned (Step 283). Thus, the similarity score may account for the profiles generated by multiple classifiers. While the FIG. 4 and the associated description above shows one method for calculating the total similarity, any other method for generating a similarity score from the profiles may also be used.

Returning to FIG. 2, once the similarity score is calculated, the similarity score is used to recommend the unknown music selection (Step 221). In one or more embodiments of the invention, the unknown music selection is recommended if the unknown music selection adheres to a similarity criterion. Recommending the unknown music selection may take a variety of forms. For example, the user may receive a digital message identifying the unknown music selection, the unknown music selection may be added to the user's playlist, the unknown music selection may be played for the user, etc.

In the following example, consider the scenario in which an individual has six hundred music selections stored on their portable digital player. In the scenario, the individual has started an exercise program and would like to generate a playlist of music stored on their portable digital player that provides the necessary environment to keep the individual exercising. Thus, the individual chooses four music selections which represent the type of music that the individual would like to hear.

Accordingly, the individual may submit a playlist generation request to an application on the individual's computer to generate a playlist. In response to the request, the application reviews all six hundred music selections to determine what genres of music should have greater granularity. The application, may determine, for example, that the individual is focused on modern rock music. Accordingly, the genre classifier is trained to recognize the different genres in modern rock music. The genre classifier may also be trained with coarser granularity to recognize other genres as well.

Next, the genre classifier classifies the four music selections chosen by the user (i.e., the music selection of the user) and the five hundred and ninety-six music selections (i.e., the unknown music selection) to obtain profiles. For each music selection, the genre classifier may create a profile of the music selection. Because the genre classifier is focused on genres within rock music, the profile is able to distinguish between the different genres of rock music.

After creating the profiles, a similarity analyzer may identify the similarity between each unknown music selection and the four music selection of the user selections to obtain a similarity score for each unknown music selection. The unknown music selections that have a similarity score above a threshold may be added to the playlist, while the unknown music selections having a similarity score below the threshold are not added to the playlist.

Further the playlist may be ordered according to the similarity score. Thus, in the example, the user is able to generate a playlist of songs that allows the user to exercise with the correct ambiance created by the playlist.

Figure 5:
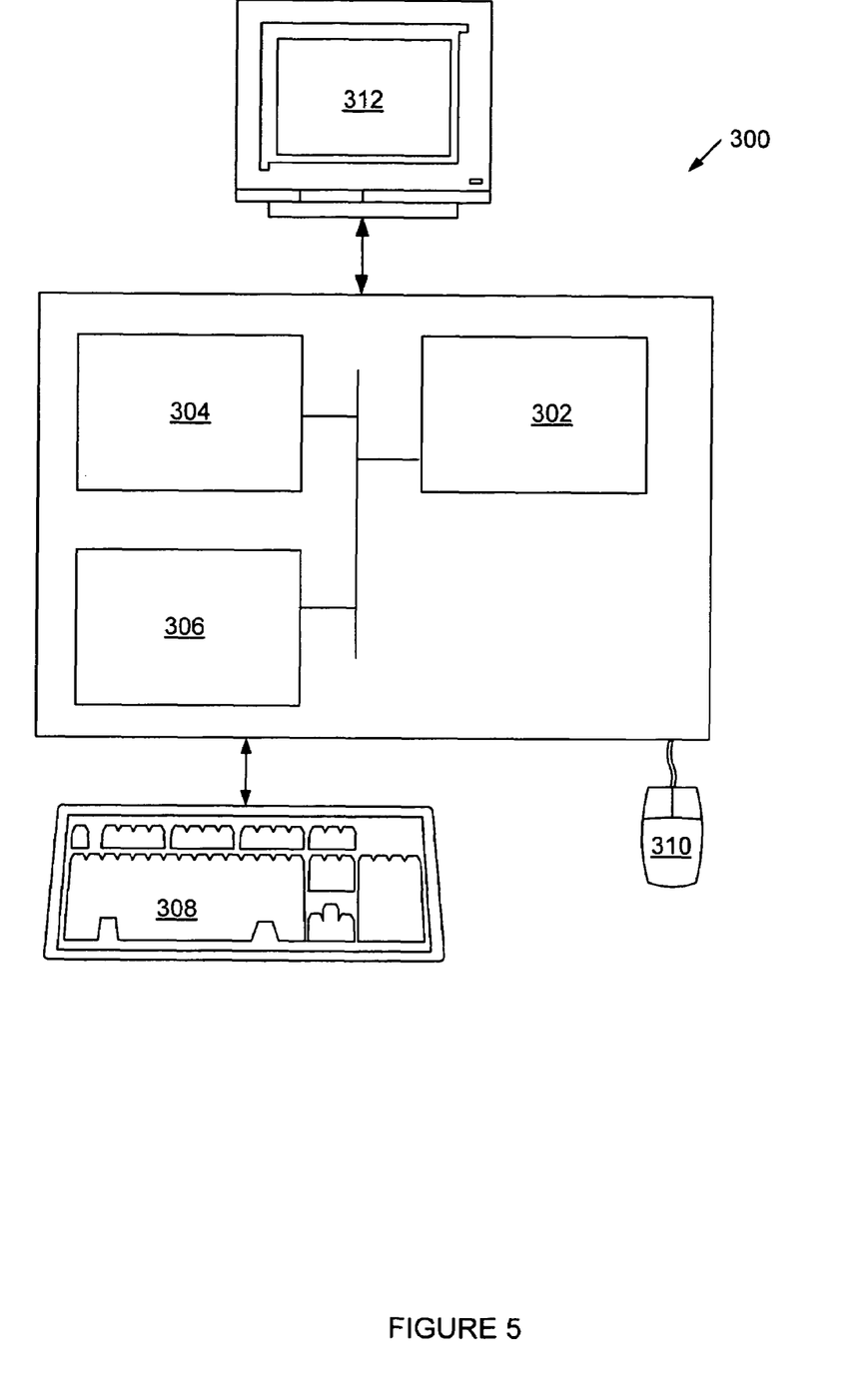
FIG. 5 shows a computer system in accordance with one or more embodiments of the invention.

The invention may be implemented on virtually any type of computer regardless of the platform being used. For example, as shown in FIG. 5, a computer system (300) includes a processor (302), associated memory (304), a storage device (306), and numerous other elements and functionalities typical of today's computers (not shown). The computer (300) may also include input means, such as a keyboard (308) and a mouse (310), and output means, such as a monitor (312). The computer system (300) is connected to a local area network (LAN) or a wide area network (e.g., the Internet) (not shown) via a network interface connection (not shown). Those skilled in the art will appreciate that these input and output means may take other forms.

Further, those skilled in the art will appreciate that one or more elements of the aforementioned computer system (300) may be located at a remote location and connected to the other elements over a network. Further, the invention may be implemented on a distributed system having a plurality of nodes, where each portion of the invention (e.g., unknown music selection, genre classifier, musicprofiles, similarity analyzer, genre definitions, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, or any other computer readable storage device.

Embodiments of the invention provide a mechanism for recommending music to the user. Further, embodiments of the invention tailor the recommendation to focus on the music the user may enjoy. Specifically, by training the genre classifier according to user preferences, the genre classifier is tailored according to the user. More specifically, because the genre classifier is not necessarily trained to recognize all genres with a fine granularity, the processing time to classify music selections into genres is minimized.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for recommending music comprising:
   identifying a granularity of a plurality of genres based on a request for music similarity, wherein the request identifies a user;
   training a genre classifier, executing on a computer processor, based on the granularity to obtain a trained genre classifier;
   calculating, using the computer processor, a first profile by the trained genre classifier, wherein the first profile comprises, for each of the plurality of genres, a likelihood that a music selection associated with the user is in the genre;
   calculating, using the computer processor, a second profile by the trained genre classifier, wherein the second profile comprises, for each of the plurality of genres, a likelihood that an unknown music selection is in the genre;
   obtaining a first similarity score between the first profile and the second profile; and
   recommending the unknown music selection to the user based on the first similarity score.

2. The method of claim 1, wherein training the genre classifier comprises:
   obtaining a sample set for each of the plurality of genres, wherein the sample set is based on the granularity;
   identifying a plurality of features for each of the sample sets, and
   wherein training the genre classifier uses linear discriminant analysis on the plurality of features.

3. The method of claim 1, further comprising:
   obtaining a plurality of features, wherein obtaining the plurality of features comprises:
      dividing the music selection of the user into a sequence of frames;
      calculating a fast Fourier transformation on each frame in the sequence of frames to obtain a plurality of coefficients for each frame; and
      calculating the plurality of features from the plurality of coefficients, wherein the plurality of features are Mel-frequency Cepstral Coefficients.

4. The method of claim 1, wherein identifying the granularity comprises:
   identifying a frequency of each genre in the music selection of the user; and
   adjusting the plurality of genres based on the frequency.

5. The method of claim 1, wherein the request is sent by the user and wherein identifying the granularity comprises accessing a stored profile of the user.

6. The method of claim 1, wherein the granularity is heterogeneous for each of the plurality of genres.

7. The method of claim 1, wherein the granularity is identified in the request.

8. The method of claim 1, further comprising:
   obtaining a second similarity score between the music selection of the user and the unknown music selection; and
   summing the first similarity score multiplied by a first weight and the second similarity score multiplied by a second weight to obtain a total similarity score, wherein recommending the unknown music selection is further performed based on the total similarity score.

9. The method of claim 1, wherein the music selection of the user is stored on a music playing device and wherein the unknown music selection is stored by a music store.

10. The method of claim 1, further comprising:
    selling the unknown music selection to the user based on recommending the unknown music selection.

11. The method of claim 1, wherein the music selection of the user is in a playlist, and wherein recommending the unknown music selection comprises recommending whether to add the unknown music selection to the playlist.

12. The method of claim 1, wherein the music selection of the user is played, and wherein recommending the unknown music selection comprises recommending whether to play the unknown music selection after the music selection of the user.

13. A system for recommending music comprising:
    a genre classifier configured to:
       identify a granularity of a plurality of genres based on a request for music similarity;
       learn to differentiate between the plurality of genres based on the granularity;
       calculate a first profile according to the granularity, wherein the first profile comprises, for each of the plurality of genres, a likelihood that a music selection of a user is in the genre; and
       calculate a second profile according to the granularity, wherein the second profile comprises, for each of the plurality of genres, a likelihood that an unknown music selection is in the genre; and
    a similarity analyzer connected to the genre classifier configured to:
       obtain a first similarity score between the first profile and the second profile; and
       recommend the unknown music selection to the user based on the first similarity score.

14. The system of claim 13, further comprising:
    a learning tool configured to:
       obtain a sample set for each of the plurality of genres, wherein the sample set is based on the granularity; and
       identify a first plurality of features for each of the sample sets,
       wherein learning to differentiate between the plurality of genres uses linear discriminant analysis on the first plurality of features; and
    a preprocessor configured to:
       divide the music selection of the user into a sequence of frames;
       calculate a fast Fourier transformation on each frame in the sequence of frames to obtain a plurality of coefficients for each frame; and
       calculate a second plurality of features from the plurality of coefficients, wherein the second plurality of features are Mel-frequency Cepstral Coefficients.

15. The system of claim 13, wherein identifying the granularity comprises:
    identifying a frequency of each genre in the music selection of the user; and
    adjusting the plurality of genres based on the frequency.

16. The system of claim 13, wherein the granularity is heterogeneous for each of the plurality of genres.

17. The system of claim 13, wherein the similarity analyzer is further configured to:
    obtain a second similarity score between the music selection of the user and the unknown music selection; and
    sum the first similarity score multiplied by a first weight and the second similarity score multiplied by a second weight to obtain a total similarity score, wherein recommending the unknown music selection is further performed based on the total similarity score.

18. The system of claim 13, wherein the music selection of the user is stored on a music playing device and wherein the unknown music selection is stored by a music store.

19. The system of claim 13, wherein the music selection of the user is in a playlist, and wherein recommending the unknown music selection comprises recommending whether to add the unknown music selection to the playlist.

20. A computer readable medium comprising computer readable program code embodied therein for causing a computer system to:

identify a granularity of a plurality of genres based on a request for music similarity, wherein the request identifies a user;

train a genre classifier based on the granularity to obtain a trained genre classifier;

calculate a first profile by the trained genre classifier, wherein the first profile comprises, for each of the plurality of genres, a likelihood that a music selection associated with the user is in the genre;

calculate a second profile by the trained genre classifier, wherein the second profile comprises, for each of the plurality of genres, a likelihood that an unknown music selection is in the genre;

obtain a first similarity score between the first profile and the second profile; and recommend the unknown music selection to the user based on the first similarity score.

\* \* \* \* \*